United States Patent Office 3,823,011
Patented July 9, 1974

3,823,011
PROMOTED IRON ORE REDUCTION PROCESS
Roger F. Sebenik and Martin O. Gernand, Baton Rouge, La., assignors to Esso Research and Engineering Company
No Drawing. Continuation of abandoned application Ser. No. 860,411, Sept. 23, 1969, which is a continuation-in-part of application Ser. No. 789,589, Jan. 7, 1969, now Patent No. 3,637,369. This application Sept. 3, 1971, Ser. No. 177,776
Int. Cl. C21b *1/02*
U.S. Cl. 75—26
8 Claims

ABSTRACT OF THE DISCLOSURE

A process is provided for the direct solid phase reduction of iron ore whereby at least a first and a second compound are added to the reduction process, the first compound being a promoter for the reduction process and being chosen from certain compounds from Groups IA, IIA, and IIIA, e.g., halides, and the second compound being either a promoter which in an ionic state wlil react with the first compound to produce a nonpromoter or the second compound is a nonpromoter.

CROSS REFERENCE

This is a continuation of application Ser. No. 860,411 filed Sept. 23, 1969, and now abandoned, which application is a continuation-in-part of a copending U.S. application Ser. No. 789,589, filed Jan. 7, 1969 now U.S. Pat. 3,637,369.

FIELD OF THE INVENTION

This invention relates to an improved process for the direct reduction of iron ore. More particularly, this invention relates to a process wherein iron ore is reduced by contact with reducing gases. Still more particularly the improvement in the process relates to the addition, just prior to the initiation of reduction or more preferably in an intermediate stage of the process, of at least a first and a second compound, the first compound being a promoter for the reaction process and being chosen from certain compounds of Groups IA, IIA, and IIIA of the Periodic Chart of the Elements and the second compound being either a promoter which in an ionic state would react with the first compound or its by-product to produce a nonpromoter, or a nonpromoting compound selected from the mentioned Groups of the Periodic Chart which reacts with the first compound or its by-products to form an iron or reduction promoter.

BACKGROUND OF THE INVENTION

The direct reduction of iron ore without conversion of the ore or its products to a molten state is a well known process and has been described in the literature. Essentially, the process involves the contacting of the ore to be reduced with a reducing medium, such as mixtures of hydrogen and its oxides, carbon and its oxides or combinations of hydrogen and carbon and their oxides so that ferric oxide (hematite) is reduced first to magnetic oxide of iron (magnetite) which, in turn, is reduced to ferrous oxide (wustite), which intermediate is finally reduced to solid, metallic, porous iron. Such reduction is commonly, though not necessarily, carried out in a series of staged, fluidized or, alternately, stationary beds or zones with the reduction medium flowing from the zone containing the most completely reduced ore to that containing the feed ore.

It has been found, however, that at relatively constant conditions all ores will not reduce at the same or similar rates. For example, both specular and nonspecular hematites must pass through the same reduction stage. Reduction of nonspecular hematite with either hydrogen, carbon monoxide, or mixtures thereof shows no significant difference. However, specular hematites, while being readily reduced by hydrogen show markedly reduced reduction rates and ultimate metallization when treated with carbon monoxide contraining gases. Even though pure hydrogen will reduce specular hematite, the economics involved with such a reducing gas make the process commercially unattractive.

It has been suggested, however, in copending application Ser. No. 789,589, that the reduction of specular hematite, as well as other other difficult to reduce ores, in the presence of carbon monoxide containing gases can be promoted by adding certain compounds of Groups IA–IIIA, preferably to the initial ferrous reduction stage (for reasons stated in that application). These promoters have the effect of increasing both the reduction rate and ultimate metallization of the product. Moreover, the credit for using these promoters can be taken either as normalizing the reduction of difficultly reducible ores, e.g., specular hematite, or as increased rates and metallization for normal ores, e.g., nonspecular hematite.

While these promoters have proved successful, they are not without their drawbacks. Thus, by the mere addition of these promoters to the reduction process, foreign materials which may have an adverse effect on the process are introduced. These adverse effects can be manifested in a variety of ways, i.e., (i) the reduced ore can be contaminated and its usefulness in the steel making process compromised, e.g., as with sodium salts; (ii) presenting a change in reduction conditions by changing the off gas composition, e.g., $CaCl_2$ breaks down and frees chlorine gas which is highly corrosive throughout the system; and (iii) using promoters that will attack the structural materials, e.g., sodium attacks the lining of the reaction vessels. By the practice of this invention, however, the promotional effects of the promoter material are maximized while the deleterious side effects attributable to these promoters are minimized.

SUMMARY OF THE INVENTION

In accordance with this invention, therefore, a process for the direct solid state reduction of iron ore is provided whereby the promotional effects of added materials are maximized while the deleterious side effects are minimized, the improved process comprising the addition of at least a first and a second compound, to a reaction zone or zones at elevated temperatures wherein iron ore is being reduced by direct reduction, to metallic iron, the first compound being a reduction promoter and being selected from the group consisting of salts, carbonates, oxides, and hydroxides of Group IA metals, and salts of Group IIA and IIIA metals and metalloids; the second compound being either a promoter which in the presence of an ionizing medium, e.g., water, ammonia, molten salt, etc., would react with the first salt to produce a nonpromoter, or the second compound may be a nonpromoter from the above-mentioned Groups of the Periodic Chart.

As mentioned in Ser. No. 789,589 the salts which are most applicable as promoters are those that would be formed by the neutralization of strong acids, e.g., sulfuric acid, nitric acid, hydrochloric acid, the halide salts being most preferred, e.g., NaCl, $CaCl_2$, $BF_3$, etc.

It is interesting to note that the hydroxides, oxides and carbonates of Group IA metals are satisfactory promoters, while the carbonates, oxides and hydroxides of Groups IIA and IIIA are nonpromoters and even tend to have an inhibitory effect on the solid state reduction reaction, i.e., the oxygen level in the product at the end of a reaction carried out at about 1500° F. tends to be higher with the presence of such inhibiting compounds than it is when the reduction is effected without recourse to any reduction modifiers or additives. While not wishing to be bound by any particular theory, it is believed that the promotional effect of these compounds is almost entirely due to the cation, e.g., Na, Ca, B, etc., but that the cation must be in a condition such that it can lend itself to promoting the reaction. Thus, it is hypothesized that the promotional effect of these compounds depends on the solubility of the compound used as a promoter in iron oxide at reaction temperatures, e.g., 1300°–1600° F. All of the Group IA and IIA compounds appear to be soluble in the iron oxide. Nevertheless, the Group IIA carbonates and hydroxides (the hydroxides actually being in the oxide form at reaction temperatures) are quite stable, have high melting points and are relatively insoluble in the iron oxide. To the contrary, a salt such as calcium chloride is readily soluble in the iron oxide. Following this hypothesis, it can be concluded that while the cation is the promoter, the proper anion is necessary for the activation of the cation.

In one application of this invention, that is, in the minimizing of promoter contamination effects by balancing the side effects of one compound aganist those of another which differ with respect to contamination of the first compound, e.g., chemical attack on the reactor, or adverse modification of the gas leaving the reduction zone or zones, two or more compounds, both of which have promotional effects on iron ore reduction may be used even though in the ionic state they would combine to produce one or more nonpromoters by changing a salt of Element Group IIA into an oxide, a carbonate, or a hydroxide.

As previously mentioned, the first compound is a promoter and may be illustrated by the halides, particularly the chlorides, of such metals as lithium, sodium, potassium, calcium, strontium, barium, boron, aluminum, etc. Also, the hydroxides, oxides, and carbonates of Group IA are effective promoters. Most preferred of the additives are the salts of the Group IA metals having an atomic number in the range of 3 to 20.

The second compound can also be a promoter, but one which in the presence of an ionizing medium would react with the first compound to form a nonpromoting compound thereby reducing the effect of the promotion system. Thus, if the first compound was sodium carbonate and the second was calcium chloride, the following reaction would occur in an ionizing medium:

$$Na_2CO_3 + CaCl_2 \rightleftharpoons 2NaCl + CaCO_3 \qquad (1)$$

while the reactants are promoters, one of the products, calcium carbonate is not a promoter. Consequently, the use of such a system would lead to a cancelling out of the effectiveness of a portion of the system.

The use of such mixed compounds as a promoter system has obvious advantages over the use of either alone. Thus, while both compounds are promoters, sodium is detrimental to steel making and attacks linings, and chlorine is corrosive to the system as a whole. (Calcium is acceptable in steel making and is nondestructive to the reduction system.) Consequently, one would add only so much of either promoter as would be necessary to achieve optimum iron oxide reducing properties. Nevertheless, the total amount of each promoter can be reduced by adding both promoters (the total concentration of promoter being the same regardless of how many promoters are used) and thereby minimizing the effects of sodium or chlorine if the promoters were used separately.

While the use of a mixed compound promoter system can be advantageous, the advantage can only be gained in the absence of an ionic combination of the promoters. Consequently, each compound must be added as a dry powder and preferably added via separate injection points. Thus, such common methods of adding promoters as slurries or solutions are not satisfactory in this instance and it is essential that the promoters be added as dry, finely divided solids, e.g., 200 mesh (Tyler Series) and below.

Now, the second compound can also be a nonpromoter having a cation of the same groups as the metals which are promoters. Essentially, however, the second compound will almost always be a Group IIA or IIIA compound since almost all of the Group IA compounds are believed to be soluble in the iron oxide at reaction temperatures. Nevertheless, the mechanism to be described hereinbelow is believed applicable, based on the previously mentioned hypothesis, to all couples of soluble and nonsoluble compounds in Groups IA, IIA, and IIIA.

In a second variation of this invention, where the promoter system employed comprises a promoter compound and a nonpromoter compound, a synergistic effect is believed to occur. Thus, the utilization of a promoter and a nonpromoter together results in greater reduction rates and metallization than if the promoter was used alone in a concentration equal to the concentration of the promoter in the nonpromoter system. While this apparent synergistic effect is not fully understood it is believed that a promoting compound may form a compound with the reducing iron oxide, thereby rendering the iron oxide more amenable to reduction, as explained in Ser. No. 789,589. If calcium chloride was used as a promter, it could act accordingly:

$$CaCl_2 + FeO \rightarrow FeO \cdot Ca + Cl_2 \qquad (2)$$

It is again hypothesized that if, say, calcium oxide was also introduced into the reduction zone, the liberated chlorine from equation (2) could act in accordance with equations (3) and (4).

$$CaO + Cl_2 \rightarrow CaCl_2 + \tfrac{1}{2}O_2 \qquad (3)$$

$$CaCl + FeO + \tfrac{1}{2}O_2 \rightarrow FeO \cdot Ca + Cl_2 + \tfrac{1}{2}O_2 \qquad (4)$$

In this manner it may be possible to utilize the anion of a promoter to activate the cation of a nonpromoter. As previously mentioned the discussion of the mechanism is rather theoretical and the mechanism could be quite complex in view of the reaction conditons, e.g., high temperatures, presence of reducing gases, presence of a metal having known catalytic effects, e.g., Fe, and the like. Nevertheless, it would appear that the only limiting feature is that the compound formed by equation (3) be a promoter, i.e., not be a compound such as calcium carbonate or aluminum hydroxide.

When the second compound is a nonpromoter it can be added either as a dry powder or as a slurry or solution. Preferably, the two compounds are in intimate contact during the addition regardless of the manner of addition.

Suitably, from about 0.1 to about 6 percent of each salt, and preferably from about 0.5 to about 2 percent, based on the weight of the ore, of certain of these compounds can be directly added to the reduction reaction zone or zones, to promote reducton. Thus, the total weight of compounds present will preferably range from about 1 to 4 percent, based on weight of ore. The different compounds vary in their effectiveness, and greater or lesser amounts are required dependent upon the nature of the salt and its state of sub-division. Higher concentrations than those stated can thus be used with somewhat greater effectiveness but generally the increase in reduction rate effectiveness increases at a decreasing rate and in some instances too great a concentration of a salt retards the rate of reduction.

In a typical fluidized bed-type reduction operation, in accordance with this inventioin, particulate dry, specular or nonspecular hematite ores, or mixtures thereof, are charged to a staged reaction vessel. These ores are contacted with upwardly flowing carbon monoxide, hydrogen or mixtures of these and other gases, e.g., fluidizing gases. The zones contain a series of fluidized beds operated at the same or at varying temperatures and the ore, at different stages of reduction, descends from one bed to the next of the series. Also, the reducing gas in contact with the beds is at a different stage of oxidation within the different zones. There is provided one or more ferric reduction zones operated at temperatures ranging from about 1000° F. to about 1800° F., and preferably from about 1300° F. to about 1600° F., and one or more ferrous reduction zones operated at temperatures ranging from about 1200° F. to about 1700° F., and preferably from about 1300° F. to about 1600° F. The promoters for use in enhancing rate reduction are charged directly to one or more, including at least the initial, ferrous reduction zone. Similar operating conditions and reduction zone staging are practicable when this invention is applied to fixed bed reduction processes.

The following nonlimiting examples and pertinent demonstrations describe the present invention in terms of such process environment, bring out the more salient features and provided a better understanding of the invention.

Portions of ore are charged into a fluidized iron ore reactor as described above. The ore is fluidized by an upwardly flowing reducing gas, as hereafter illustrated. The gas flows from a zone containing an iron ore at a lower level of oxidation to the next higher level of oxidation, i.e., from the bottom to the top of the reactor. In the top ferric zone, the partially oxidized gas is burned with air to provide heat to the various reduction stages. The reduced ore moves from the top to the bottom of the reactor and from one stage of reduction to the next. The ferric reduction stages, wherein ferric oxides are reduced essentially to magnetic oxides of iron, and thence to ferrous oxide, are operated at 1500° F. and at substantially atmospheric pressure, as are the ferrous reduction stages wherein the ferrous oxide is reduced, and metallized. The promoters are charged to the latter stages when a fluidized bed system is used, as hereinabove described.

Such a fluidized-bed, zoned-reduction system is well suited to, but not a requisite for, practice of this invention using selected compounds, both of which are promoters, but which differ in their side effects, e.g., product contamination, reactor liner degradation, and increase in reactor off-gas corrosivity. In the following example mixed $Na_2CO_3$ and $CaCl_2$ promoters were combined to illustrate the application of this invention in the reduction of a specular hematite ore.

EXAMPLE I

The following Table I shows that $CaCl_2$ and $Na_2CO_3$ can be used in combination in the fluidized reduction of iron ore without the formation of $CaCO_3$, a nonpromoter, with an attendant loss in promoter effectiveness.

TABLE I

[Fluid bed reductions showing combination effects of selected promoter components]

| Run number | Promoter (wt. percent on ore) | Percent Fe as metallic iron |
|---|---|---|
| 1 | None | 74.3 |
| 2 | 2% $CaCl_2$, 2% $Na_2CO_3$ | 95.7 |
| 3 | 2% $CaCl_2$ | 86.0 |
| 4 | 3% $Na_2CO_3$ | 78.8 |

It can be seen that the degree of reduction as measured by the percent of Fe analyzed as metallic iron in the product was greatest for the reduction made with the combined $Na_2CO_3$ and $CaCl_2$. Run Nos. 3 and 4 show that neither the Na+ from the $Na_2CO_3$ nor the Ca++ from the $CaCl_2$ can promote the reduction as effectively alone when used at similar concentrations. Had the $CaCl_2$ and $Na_2CO_3$ combined to form $CaCO_3$, a nonpromoter at the reduction conditions used, and NaCl, there would have been a loss of Ca++ ions in a promoter form. Hence it is apparent that the $CaCl_2$ was effective and so was the $Na_2CO_3$. Moreover, comparison of Run 3 with Run 2 indicates that the high metallization achieved in Run 2 can not be attributed to the presence of the $CaCl_2$ above.

This test series was carried out using a fluidized bed of 400 gms. ore charge. The ore was reduced from the ferrous form to highly metallized iron particles at a temperature of 1500° F. The $CaCl_2$ was added wet to the ore and the mixture was then dried before being charged to the reactor. The $Na_2CO_3$ was added as a dry powder when the charge had reached 1500° F. and the reducing gas was being first introduced. The gas for these reductions consisted of:

|  | Percent |
|---|---|
| Nitrogen | 7 |
| Hydrogen | 49 |
| Water | 6 |
| CO | 36 |
| $CO_2$ | 2 |

The pressure was atmospheric throughout all of these reduction tests.

EXAMPLE II

Alternately certain compounds can be used in combination to obtain improved reduction even though one or more of the additive mixture is not a promoter alone. The following Table shows the results of using calcium hydroxide, a reduction inhibitor, and calcium chloride, a known reduction promoter, both alone and in combination in the reduction of raw hematite. The value of $x$ in $FeO_x$ indicate the extent of reduction, i.e., lower value, greater reduction.

TABLE II

[Fixed bed reduction showing synergistic promotion effect of mixed salts]

| Run number | Total wt. percent Ca++ | Percent Ca++ as $CaCl_2$ | $x$ in $FeO_x$ |
|---|---|---|---|
| 1 | None | | 0.224 |
| 2 | 0.58 | 100 | 0.158 |
| 3 | 0.83 | 100 | 0.055 |
| 4 | 1.15 | 100 | 0.053 |
| 5 | 1.16 | 100 | 0.036 |
| 6 | 1.53 | 100 | 0.030 |
| 7 | 1.30 | None | 0.336 |
| 8 | 0.62 | None | 0.286 |
| 9 | 1.22 | 6 | 0.213 |
| 10 | 1.13 | 27 | 0.120 |
| 11 | 1.36 | 31 | 0.092 |
| 12 | 1.35 | 40 | 0.027 |
| 13 | 1.25 | 54 | 0.017 |

These results were obtained by analyzing the ferrous reduction zone thirty minutes after adding the promoter. Run 1 was a control, i.e., no promoter added. Runs 7 & 8 show the effect of adding only calcium hydroxide. Thus, $x$ in these two runs rises well above the value of $x$ when no additive was used, thereby suggesting that calcium hydroxide deleteriously affects reduction properties of the system. Runs 2–6 show the effect on the value of $x$ when calcium chloride alone is employed. Runs 9 through 13 show the results when both $CaCl_2$ and $Ca(OH)_2$ are added as a mixed salt promoter. Considering Run 13 in particular where .68% calcium (on ore) was added as $CaCl_2$ (54% of total Ca++ added) and .58% calcium (on ore) was added as $Ca(OH_2)$ and comparing its experimentally obtained $x$ (in $FeO_x$) with Runs 2 and 3 (.58 and .83% calcium on ore) as $CaCl_2$) and Run 8 (.62% as $Ca(OH)_2$), it is apparent that more complete reduction was achieved with the mixed salt than by using either alone. In fact comparing Run 13 with Runs 5 and 6 suggests that all of the mixed salt calcium acted as if it were $CaCl_2$.

The same conclusion is reached by a comparison of the results from Runs 9 through 12 with the curve generated by plotting the data from Runs 2 through 6. In all cases the reduction results are equivalent to those obtainable if there were twice the calcium actually added as calcium chloride.

In the above example, specular hematite ore samples with various amounts of promoter ($CaCl_2$, $Ca(OH)_2$ or $CaCl_2/Ca(OH)_2$ mixtures) were prepared by the wet addition method. In this technique, the promoter was mixed with the raw hematite ore via an aqueous slurry. Following mixing of the ore with the salt, the water was evaporated and the promoter allowed to crystallize on the ore.

A portion of the ore was then analyzed for $Ca^{++}$ and $Cl^-$ to determine the amount of salt added to the ore. Each of the promoted samples was then reduced in a fixed bed unit using a common set of reduction conditions:

| Reduction conditions | Temp., °F. | Press., p.s.i.g. | Gas composition | | | | Time (min.) |
|---|---|---|---|---|---|---|---|
| | | | $H_2$ | $H_2O$ | CO | $CO_2$ | |
| Wustite stage | 1,320 | 103 | 62.3 | 37.7 | | | 15 |
| Ferrous stages | 1,500 | Atmos. | 53.1 | 6.5 | 37.0 | 3.4 | 30 |

At the end of the ferrous reduction, the reduced product was analyzed for iron and oxygen content.

What is claimed is:

1. A process for the direct reduction of iron ore to metallic iron which comprises contacting, in a reaction zone at elevated temperatures, iron ore with a reducing gas, and introducing into the reaction zone as finely divided dry solids at least a first compound and a second compound, said first compound being selected from the group consisting of
   (a) carbonates and hydroxides of Group IA metals,
   (b) halide, sulfate, and nitrate salts fromed from Groups IA, IIA, and IIIA metals, and
   (c) metalloids, said first compound being introduced in sufficient amounts to increase the rate of reduction of the iron ore to metallic iron at existing conditions, the said second compound being selected from the group consisting of
   (d) carbonates and hydroxides of Groups IIA and IIIA metals, and
   (e) a compound of Group IIA and IIIA metals which if in an ionizing medium would react with said first compound to produce a comopund designated as (d), thereby further increasing the rate of reduction.

2. The process of claim 1 wherein the second compound is designated as (e).

3. The process of claim 1 wherein the first compound is a halide salt and the second compound is a carbonate.

4. The process of claim 1 wherein about 0.5 to about 2.0 percent of each of the first and second compounds are added to the reduction process.

5. The process of claim 1 wherein the reduction is carried out in a fixed bed.

6. The process of claim 1 wherein the reduction is carried out in a plurality of fluidized beds.

7. The process of claim 6 wherein the first and second compounds are added to the ferrous reduction zone.

8. The process of claim 7 wherein the ferrous reduction zone is operated at temperatures of about 1200° F. to about 1700° F.

References Cited

UNITED STATES PATENTS

| | | | |
|---|---|---|---|
| 2,444,916 | 7/1948 | Cape | 75—34 |
| 3,341,322 | 9/1967 | Bailey | 75—26 |
| 3,393,066 | 7/1968 | Mayer | 75—26 |

L. DEWAYNE RUTLEDGE, Primary Examiner

P. D. ROSENBERG, Assistant Examiner

U.S. Cl. X.R.

75—34